US011372761B1

(12) United States Patent
Gupta et al.

(10) Patent No.: US 11,372,761 B1
(45) Date of Patent: Jun. 28, 2022

(54) DYNAMICALLY ADJUSTING PARTITIONED SCM CACHE MEMORY TO MAXIMIZE PERFORMANCE

(71) Applicant: International Business Machines Corporation, Armonk, NY (US)

(72) Inventors: Lokesh M. Gupta, Tucson, AZ (US); Kevin J. Ash, Tucson, AZ (US); Kyler A. Anderson, Tucson, AZ (US); Matthew G. Borlick, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/119,470

(22) Filed: Dec. 11, 2020

(51) Int. Cl.
*G06F 12/00* (2006.01)
*G06F 12/0846* (2016.01)
*G06F 3/06* (2006.01)

(52) U.S. Cl.
CPC ........ *G06F 12/0848* (2013.01); *G06F 3/0604* (2013.01); *G06F 3/0644* (2013.01); *G06F 3/0679* (2013.01); *G06F 2212/282* (2013.01); *G06F 2212/7204* (2013.01)

(58) Field of Classification Search
CPC ............ G06F 12/0848; G06F 12/0871; G06F 2212/282
See application file for complete search history.

(56) References Cited

U.S. PATENT DOCUMENTS

| | | | |
|---|---|---|---|
| 2004/0193803 A1* | 9/2004 | Mogi | G06F 12/0871 711/129 |
| 2012/0096225 A1 | 4/2012 | Khawand et al. | |
| 2013/0138889 A1 | 5/2013 | Chockler et al. | |
| 2017/0142217 A1 | 5/2017 | Misra et al. | |
| 2018/0011799 A1 | 1/2018 | Ash et al. | |
| 2018/0121474 A1* | 5/2018 | Lee | G06F 16/27 |
| 2018/0267962 A1* | 9/2018 | Sprague | G06F 3/067 |
| 2019/0095111 A1* | 3/2019 | Bab-Dinitz | G06F 12/0862 |
| 2021/0157725 A1* | 5/2021 | Barbalho | G06F 12/0802 |
| 2021/0216475 A1* | 7/2021 | Kucherov | G06F 12/123 |

* cited by examiner

*Primary Examiner* — Baboucarr Faal
(74) *Attorney, Agent, or Firm* — Robert M Sullivan (57) ABSTRACT

A method for dynamically adjusting cache memory partition sizes within a storage system includes computing a read hit ratio for data accessed in each cache partition and an average read hit ratio for all the cache partitions over a time interval. The cache memory includes a higher performance portion (DRAM) and lower performance portion (SCM). The method increases or decreases the partition size for each cache partition by comparing the read hit ratio for the partition to the average read hit ratio for all the partitions. Each cache partition includes maximum and minimum partition sizes, and read hit and read access counters. The SCM portion of the cache memory includes cache partitions reserved for storing data of a specific type, or data used for a specific purpose or with a specific software application. A corresponding storage controller and computer program product are also disclosed.

20 Claims, 7 Drawing Sheets

DYNAMICALLY ADJUSTING PARTITIONED SCM CACHE MEMORY TO MAXIMIZE PERFORMANCE

BACKGROUND

Field of the Invention

This invention relates generally to data processing and data storage systems, and more particularly to systems and methods for improving cache memory performance and management within a storage system.

Background of the Invention

In the fields of data processing or data storage systems, a "cache" or "cache memory" typically refers to a small, fast memory or storage media used to store data or instructions that were accessed recently, are accessed frequently, or are likely to be accessed in the future. Reading from or writing to a cache memory is typically less expensive, in terms of access time and/or resource utilization, than accessing other memory or storage devices. Once data is stored in cache memory, it can be accessed in cache memory instead of re-fetching and/or re-computing the data, saving time and system resources, and improving system performance.

Cache memories can be implemented as multi-level caches. For example, a cache memory system may include both "primary" and "secondary" caches. When reading data, a computing system or device may first look for data in the primary cache and, if the data is not located, look for it in the secondary cache. If the data is not in either cache, the computing system or device may retrieve the data from disk drives or other backend storage devices that reside behind the cache. When writing data, a computing system or device may write data to the primary cache. This data may subsequently be moved, or destaged, to the secondary cache or a storage device to free up memory space in the primary cache.

Flash memory and other solid-state memory devices can potentially create caches with much larger storage capacities than those using more expensive memory such as dynamic random-access memory (DRAM) cache. For example, storage class memory (SCM), a type of non-volatile NAND flash memory, provides access speeds that are much higher than solid state drives (SSDs). SCM is much cheaper than DRAM but has higher latency than DRAM (microseconds compared to nanoseconds). Because SCM uses flash memory to store data, SCM exhibits some of the same limitations and deficiencies as flash memory, such as write-cycle limits and issues with data fragmentation.

Larger cache memory systems can improve the performance of data storage systems, since more data can be stored in the faster access memory. Cache management algorithms and processes can be implemented to increase the likelihood that frequently accessed data can be stored in the areas of cache memory that can be accessed more quickly. Storage systems can also designate portions of the cache memory for specific types of data, or data used for specific purposes.

In view of the foregoing, what are needed are systems and methods that improve cache memory management techniques and utilize larger cache memories that comprise multiple heterogeneous memory types.

SUMMARY

The invention has been developed in response to the present state of the art and, in particular, in response to the problems and needs in the art that have not yet been fully solved by currently available systems and methods. The features and advantages of the invention will become more fully apparent from the following description and appended claims, or may be learned by practice of the invention as set forth hereinafter.

According to an embodiment of the invention, a method for dynamically adjusting the size of partitions designated for specific data types or data used for specific purposes within a cache memory is disclosed. In an embodiment, the cache memory includes a higher performance portion and a lower performance portion that consist of different heterogeneous memory types. In an embodiment, the lower performance portion of the cache memory includes cache partitions designated for specific data types or data used for specific purposes, each partition includes a minimum and maximum size. In an embodiment, the method calculates periodically a cache hit ratio for each cache partition. The method calculates an average of the cache hit ratios for cache partitions. In an embodiment, the method compares the cache hit ratio to the average cache hit ratio for each cache partition. The method then adjusts the size of the cache partition based on the difference between the specific cache hit ratio of the partition and the average cache hit ratio of all the partitions, while adhering to the limitations of the maximum and minimum sizes of each cache partition. In an embodiment, the method can adjust the size of a cache partition specified for metadata tracks, and the size of a cache partition specified for favored storage volumes. In an embodiment, the method can adjust the size of a cache partition specified for cache fast write (CFW) data tracks, and the size of a cache partition specified for data tracks used for storage system applications that require prefetched data. In an embodiment, the method can adjust the size of cache partitions specified for pinned data.

According to other embodiments of the invention, a corresponding storage controller and computer program product are disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
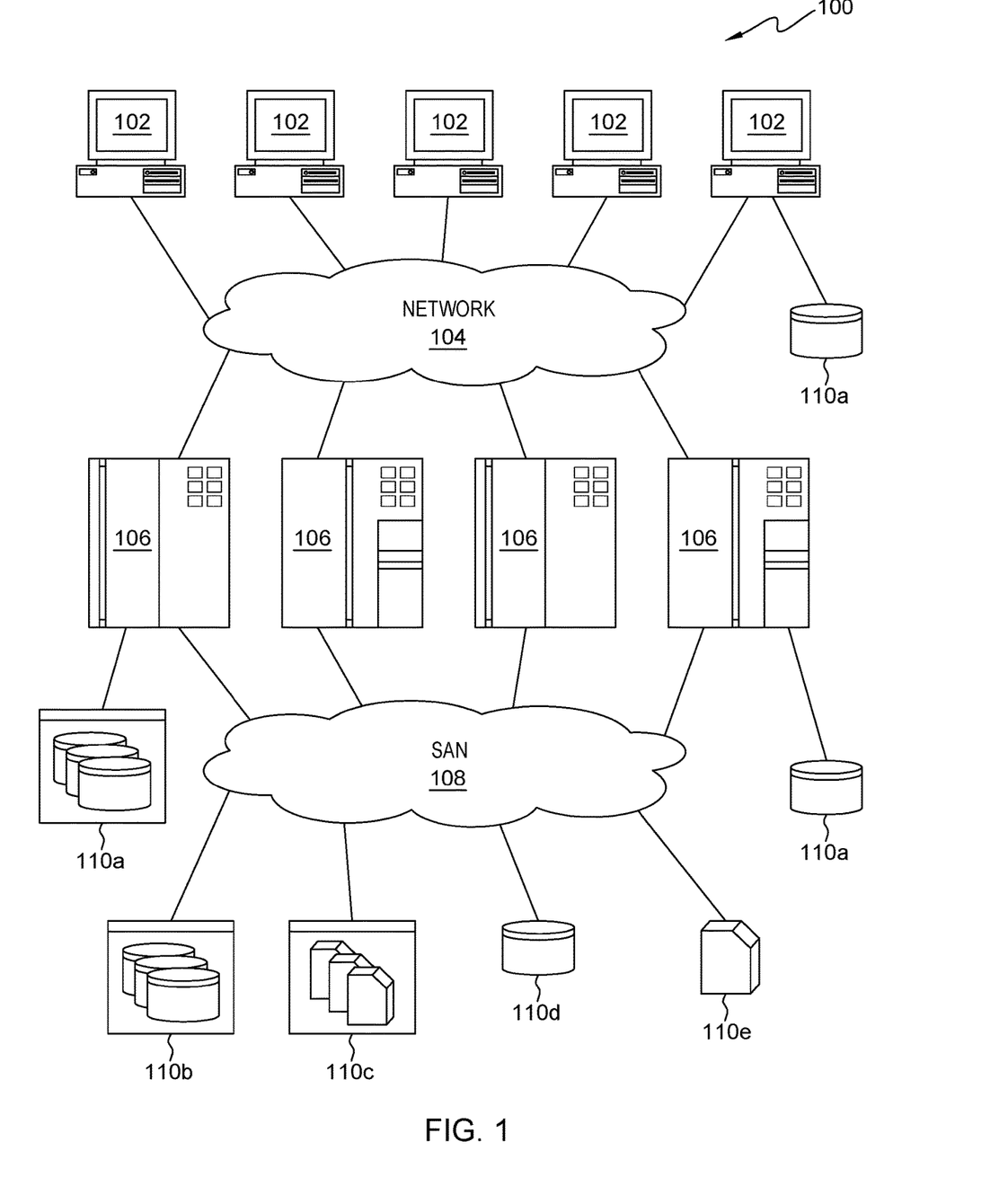
FIG. 1 is a high-level block diagram representing an example of a network environment, in which systems and methods in accordance with embodiments of the invention may be implemented.

Referring to FIG. 1, one example of a network environment 100 is illustrated. The network environment 100 represents an example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" or "host processors" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
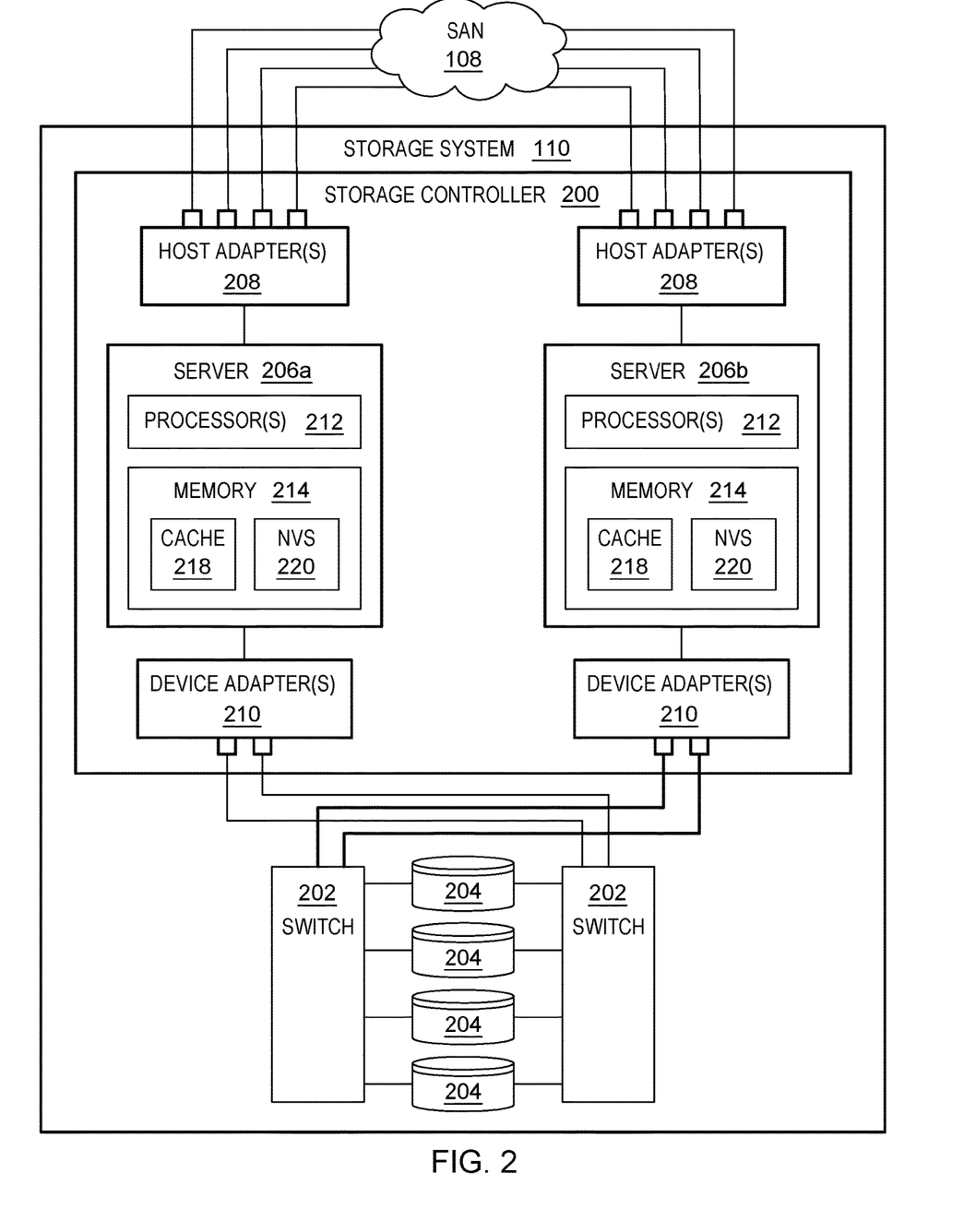
FIG. 2 is a high-level block diagram representing an example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host processor 106 (e.g., an open system or mainframe server 106) performs a read operation, the server 206 that performs the read operation may fetch data from the storages devices 204 and save it in its cache 218 in the event it is required again. If the data is requested again by a host processor 106, the server 206 may fetch the data from the cache 218 instead of fetching it from the storage devices 204, saving both time and resources. Similarly, when a host processor 106 performs a write operation, the server 106 that receives the write request may store the write data in its cache 218, and destage the write data to the storage devices 204 at a later time. When the write data is stored in cache 218, the write data may also be stored in non-volatile storage (NVS) 220 of the opposite server 206 so that the write data can be recovered by the opposite server 206 in the event the first server 206 fails. In certain embodiments, the NVS 220 is implemented as battery-backed memory in the opposite server 206.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
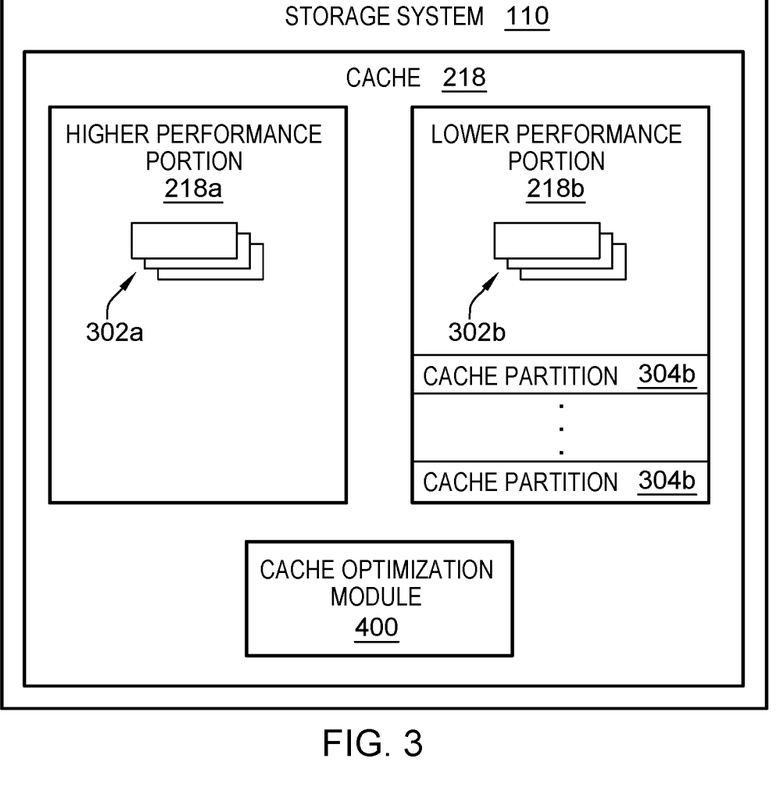
FIG. 3 is a high-level block diagram representing a storage system for improving cache memory management, in accordance with an embodiment of the invention.

Storing data in the cache memory 218 improves the performance of the storage system 110. I/O operations with the host processor 106 can complete much faster and quicker when the storage system 110 accesses the requested data from the cache memory 218 as compared to a storage device 204. FIG. 3 shows a high-level block diagram of a storage system 110 having a cache memory 218 that improves the storage system performance. In certain embodiments, the cache memory 218 includes a higher performance portion 218a for storing storage elements 302a, or data tracks, and a lower performance portion 218b for storing storage elements 302b, or data tracks. In certain embodiments, cache management policies can store more important data in the higher performance portion 218a, since this portion of the cache memory 218 may provide quicker access to the data. In certain embodiments, the lower performance portion 218b can include cache partitions 304b that are designated to store storage elements 302b of a specific data type, or storage elements 302b that relate to specific system applications or purposes, since this portion of the cache memory 218 is larger and less expensive. In certain embodiments, cache management policies can designate cache partitions 304b in the lower performance portion 218b for data tracks containing metadata, data tracks for favored storage volumes, data tracks for cache fast write (CFW) data used in software applications that perform sorting algorithms, data tracks used for software applications that required prefetched data, and for other specified purposes. In certain embodiments, each cache partition 304b stores storage elements 302b related to a unique type or purpose, which differs from the type or purpose for storage elements 302b stored in another cache partition 304b. For example, metadata storage elements 302b are stored in one specific cache partition 304b, while storage elements 302b related to cache fast write (CFW) applications are stored in a separate cache partition 304b. In certain embodiments, a cache optimization module 400 includes logic to perform and implement these and other cache management policies.

As stated earlier, flash memory and other solid-state memory devices can potentially create cache memories with much larger storage capacities than those using more expensive memory, such as DRAM. Storage class memory (SCM), for example, is a type of non-volatile NAND flash memory that provides access speeds that are much higher than solid state drives (SSDs). SCM is much cheaper than DRAM but has higher latency than DRAM (microseconds compared to nanoseconds). Because SCM may use flash memory to store data, SCM may exhibit some of the same limitations and deficiencies as flash memory, such as write-cycle limits and issues with data fragmentation. Because of the potential to use SCM to create cache memories with much larger storage capacities, systems and methods are needed to effectively incorporate flash memory, such as SCM, into a cache memory.

Figure 4:
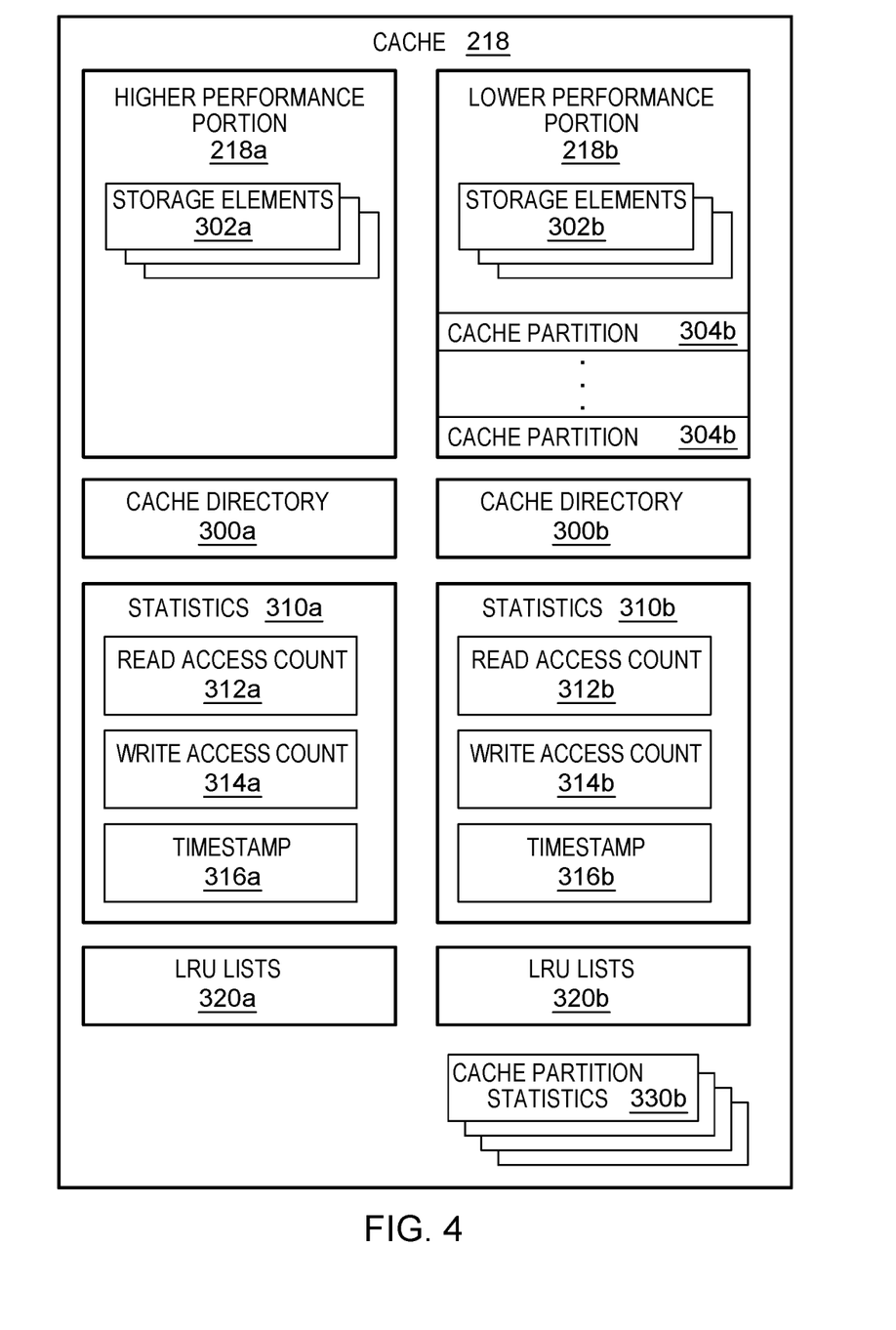
FIG. 4 is a high-level block diagram representing an improved cache memory system having higher performance and lower performance portions, in accordance with an embodiment of the invention.

FIG. 4 represents a high-level block diagram of a cache memory 218 that has a higher performance portion 218a and a lower performance portion 218b. In certain embodiments, the higher performance portion 218a is made up of DRAM memory and the lower performance portion 218b is made up of SCM memory, although neither are limited to these types of memory. The higher performance portion 218a and lower performance portion 218b may be used together to provide a cache 218 within a storage system 110 such as the IBM DS8000™ enterprise storage system. Because memory making up the lower performance portion 218b is likely cheaper than memory making up the higher performance portion 218a, the lower performance portion 218b may be larger, perhaps much larger, than the higher performance portion 218a.

In an embodiment, the higher performance portion 218a includes a cache directory 300a, statistics 310a, and LRU (least recently used) lists 320a. The cache directory 300a records which storage elements 302a, or data tracks, are stored in the higher performance portion 218a and the location in which the data is stored. In certain embodiments, the statistics 310a include a read access count 312a, a write access count 314a, and a timestamp 316a for each storage element 302a, or data track, that resides in the higher performance portion 218a. The read access count 312a is incremented each time the storage element 302a is read in the higher performance portion 218a. The write access count 314a is incremented each time the storage element 302a is modified in the higher performance portion 218a. The timestamp 316a is updated with a value that indicates the current time when the storage element 302a is accessed (either read or written). In certain embodiments, the LRU lists 320a include a list of storage elements 302a ordered from the storage element 302a that was most recently accessed (MRU) to the storage element 302a that was least recently accessed (LRU). The LRU lists 320a are used to determine which storage element 302a in the higher performance portion 218a is the least recently used.

In certain embodiments, the lower performance portion 218b of the cache memory 218 also includes a cache directory 300b, statistics 310b, and LRU (least recently used) lists 320b. The cache directory 300b records which storage elements 302b, or data tracks, are stored in the lower performance portion 218b and the location in which the data is stored. In certain embodiments, the statistics 310b include a read access count 312b, a write access count 314b, and a timestamp 316b for each storage element 302b, or data track, that resides in the lower performance portion 218b. The read access count 312b is incremented each time the storage element 302b is read in the lower performance portion 218b. The write access count 314b is incremented each time the storage element 302b is modified in the lower performance portion 218b. The timestamp 316b is updated with a value that indicates the current time when the storage element 302b is accessed (either read or written). In certain embodiments, the LRU lists 320b include a list of storage elements 302b ordered from the storage element 302b that was most recently accessed (MRU) to the storage element 302b that was least recently accessed (LRU). The LRU lists 320b are used to determine which storage element 302b in the lower performance portion 218b is the least recently used.

As stated earlier, the lower performance portion 218b of the cache memory, in certain embodiments, includes cache partitions 304b, which are specified regions of the lower performance portion 218b of the cache memory that are designated to store specific types of storage elements 302b, or storage elements 302b related to a specific purpose. Each cache partition 304b stores storage elements 302b related to a unique type or purpose, which differs from the type or purpose for storage elements 302b stored in another cache partition 304b. In certain embodiments, the lower performance portion 218b of the cache memory includes cache partition statistics 330b, which include information relating to the cache partitions 304b.

Figure 5:
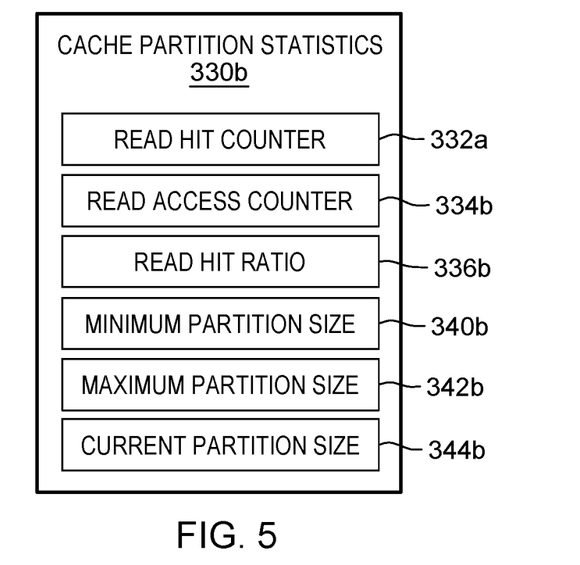
FIG. 5 is a high-level block diagram representing a cache partition statistics component of a cache memory system, in accordance with an embodiment of the invention.

FIG. 5 represents a high-level block diagram of the cache partition statistics 330b component of the lower performance portion 218b of the cache memory. In certain embodiments, each unique cache partition 304b maintains a unique version of cache partition statistics 330b. In certain embodiments, the cache partition statistics 330b include a read hit counter 332b, a read access counter 334b, a read hit ratio 336b, a minimum partition size 340b, a maximum partition size 342b, and a current partition size 344b. The read hit counter 332b is incremented each time a read hit occurs within the cache partition 304b. That is, a read operation is satisfied by reading the requested storage element 302b from the cache partition 304b. The read access counter 334b is incremented for every time a storage element 302b relating to the data type or purpose unique to the cache partition 304b is read, whether or not the requested storage element 302b was accessed from the cache partition 304b. The read hit ratio 336b is calculated by dividing the read hit counter 332b by the read access counter 334b.

In certain embodiments, the minimum partition size 340b indicates the smallest amount of memory in the lower performance portion 218b of the cache memory that can be allocated for the specific cache partition 304b. The maximum partition size 342b indicates that largest amount of memory from the lower performance portion 218b of the cache memory that can be allocated for the specific cache partition 304b. The current partition size 344b indicates the amount of memory from the lower performance portion 218b of the cache memory that is presently allocated for the specific cache partition 304b.

Figure 6:
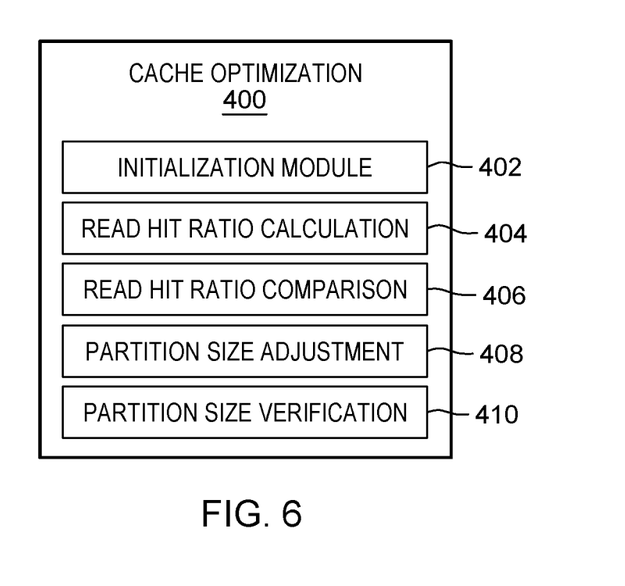
FIG. 6 is a high-level block diagram representing cache optimization module and component modules, in accordance with an embodiment of the invention.

In certain embodiments, a cache optimization module 400 provides logic and functionality to dynamically adjust the size of the cache partitions 304b in the lower performance portion 218b of the cache memory. FIG. 6 represents a high-level block diagram of an embodiment of a cache optimization module 400. The cache optimization module 400 and component modules may be implemented in hardware, software, firmware, or combinations thereof. The cache optimization module 400 and component modules are presented by way of example and not limitation. A larger or smaller number of component modules may be provided in different embodiments. For example, the logic and functionality of some component modules may be combined into a single or smaller number of component modules, or the logic and functionality of a single component module may be distributed across several component modules. Although the cache optimization module 400 and component modules are shown within the storage system 110, all logic and functionality is not necessarily implemented within the storage system 110, nor is it limited to implementation within the storage system 110. Thus, the location of the cache optimization module 400 and component modules is provided by way of example and not limitation.

In an embodiment, the cache optimization module 400 may include one or more of an initialization module 402, a read hit ratio calculation module 404, a read hit ratio comparison module 406, a partition size adjustment module 408, and a partition size verification module 410. In an embodiment, the initialization module 402 includes logic and functionality to initialize cache partitions 304b in the lower performance portion 218b of the cache memory. The initialization module also initializes the cache partition statistics 330b for each of the cache partitions 304b including resetting the read hit counter 332b, the read access counter 334b, and the read hit ratio 336b, and setting the minimum 340b, maximum 342b, and current 344b partition sizes. In an embodiment, the read hit calculation module 404 includes logic and functionality to compute the read hit ratio 336b for each cache partition 304b by dividing the read hit counter 332b by the read access counter 334b. As stated earlier, the read hit counter 332b is incremented for each read hit occurs for any storage element 302b stored within the cache partition 304b, and the read access counter 334b is incremented for each read access that occurs for any storage element 302b that is stored within the cache partition 304b. In an embodiment, the read hit ratio comparison module 406 includes logic and functionality to compute an average read hit ratio for all of the cache partitions 304b. The read hit comparison module also includes logic and functionality to compare the read hit ratio 336b for each cache partition 304b to the average read hit ratio for all cache partitions 304b.

In certain embodiments, the partition adjustment module 408 includes logic and functionality to adjust the partition size for each cache partition 304b by multiplying the difference between the partition read hit ratio 336b and the computed average read hit ratio by a designated constant memory size (for example 50% of the minimum partition size 342b of the smallest cache partition 304b). If the partition size increases, the partition adjustment module 408 includes logic and functionality to add the computed increase to the current partition size 344b to compute a new current partition size 344b and verifies that the new current partition size 344b is not greater than the maximum partition size 342b. If the partition size decreases, the partition adjustment module 408 includes logic and functionality to subtract the computed decrease to the current partition size 344b to compute a new current partition size 344b and verifies that the new current partition size 344b is not less than the minimum partition size 340b. In certain embodiments, the partition size verification module 410 includes logic and functionality to confirm that the computed increases to the cache partitions 304b are equal to the computed decreases to the cache partitions 304b. In addition, the partition size verification module 410 includes logic and functionality to confirm that the sum of the current partition size 344b for all of the cache partitions 304b does not exceed the total size for the cache partitions 304b allowed in the lower performance portion 218b.

As stated earlier, flash memory and other solid-state memory devices can potentially create cache memories with much larger storage capacities than those using more expensive memory, such as DRAM. Storage class memory (SCM), for example, is a type of non-volatile NAND flash memory that provides access speeds that are much higher than solid state drives (SSDs). SCM is much cheaper than DRAM but has higher latency than DRAM (microseconds compared to nanoseconds). Because SCM may use flash memory to store data, SCM may exhibit some of the same limitations and deficiencies as flash memory, such as write-cycle limits and issues with data fragmentation. Because of the potential to use SCM to create cache memories with much larger storage capacities, systems and methods are needed to effectively incorporate flash memory, such as SCM, into a cache memory.

As stated earlier also, cache management strategies need to be developed to store, within designated cache partitions 304b in the lower performance portion 218b (SCM) of the cache memory 218, storage elements 302b of a specific data type or used for a specific purpose with a specific software application, and to dynamically adjust the size of the designated cache partitions 304b during storage system operation. In certain embodiments, each cache partition 304b stores storage elements 302b having a unique data type or associated with a specific purpose or used with a specific software application. In certain embodiments, cache management policies adjust each cache partition 304b within a minimum 340b and maximum 342b partition size based on an aspect of the storage system performance and cache memory 218 usage. In certain embodiments, cache management policies monitor the read hits for all storage elements 302b within each cache partition 304b and adjust the partition size 344b for each cache partition 304b based on the relative read hit ratio for each cache partition 304b within a certain time period.

Figure 7A:
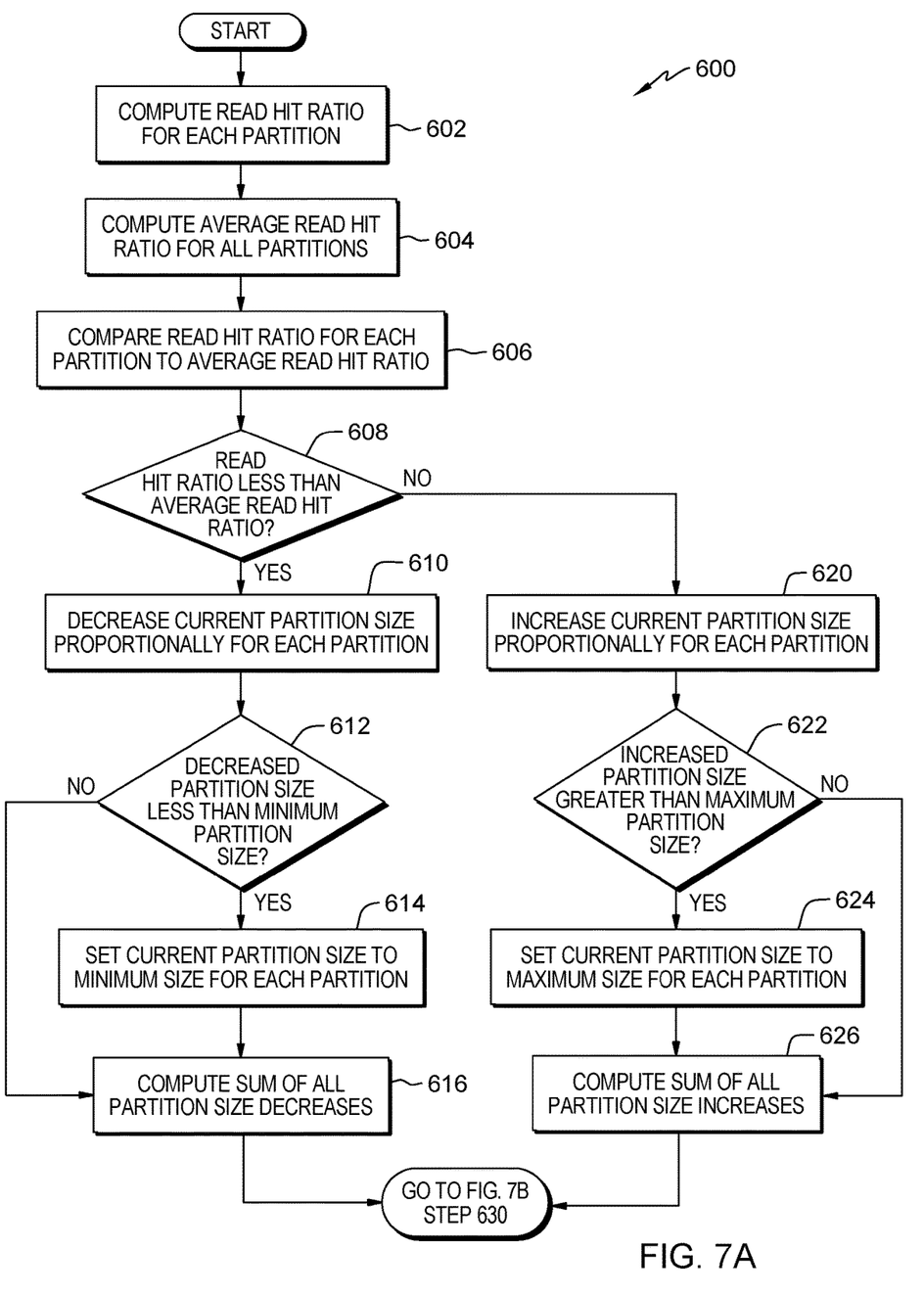
FIGS. 7A and 7B are a flow diagram representing an embodiment of a method for dynamically adjusting the size of cache partitions in the lower performance portion of the cache memory.
Figure 7B:
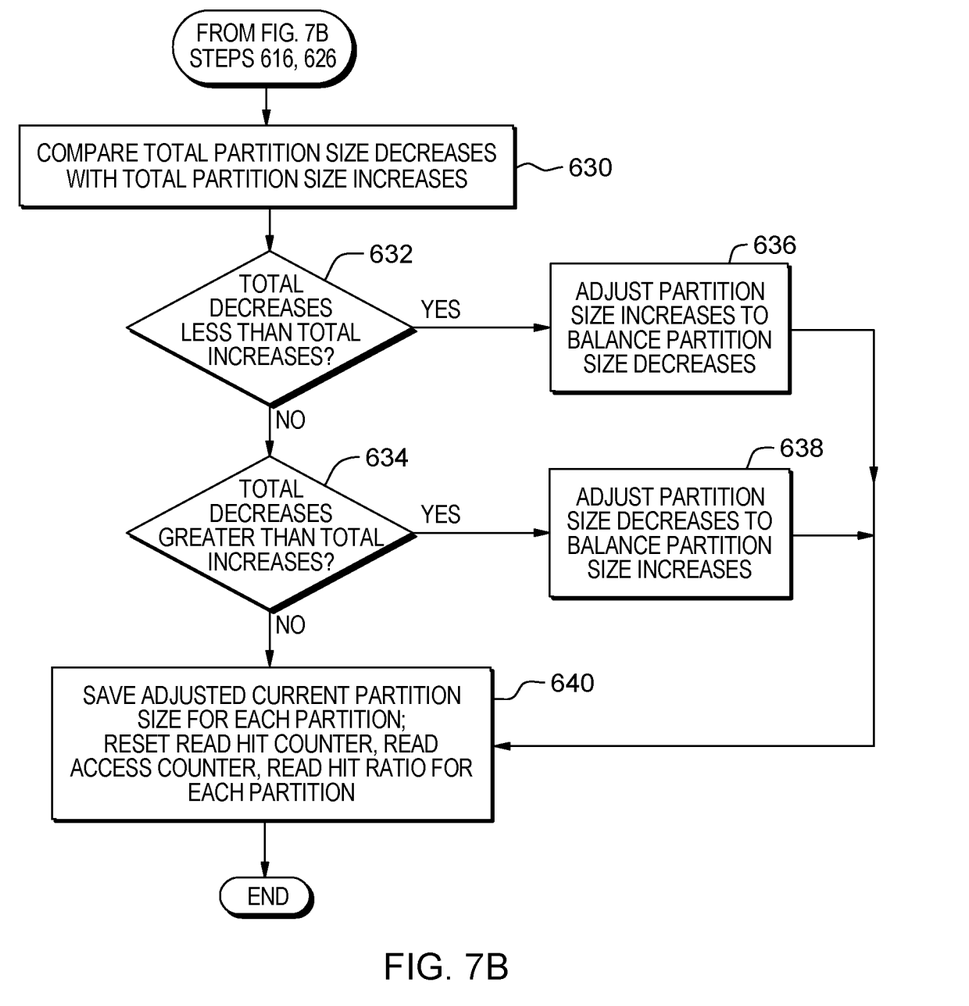

FIGS. 7A and 7B represent an embodiment of a method 600 for dynamically adjusting the partition size 344b for each cache partition 304b within the lower performance portion 218b (SCM) of the cache memory 218. In certain embodiments, the method 600 is invoked periodically to determine whether the current partition sizes 344b of the cache partitions 304b need to be adjusted. In certain embodiments, the cache management policies within the storage system 110 use background tasks to invoke the method 600 after a specified time interval has elapsed. In certain embodiments, the cache management policies within the storage system 110 invoke the method when specified performance criteria are detected or measured. In an embodiment, the method 600 initially computes at step 602 a read hit ratio 336b for each cache partition 304b. In an embodiment, the read hit ratio 336b is computed by dividing the read hit counter 332b by the read access counter 334b stored in the cache partition statistics 330b for each cache partition 304b. In an embodiment, the method 600 computes at step 604 an average read hit ratio for all the cache partitions 304b. The average read hit ratio can be computed by adding the read hit ratio 336*b* for each cache partition 304*b* and dividing by the total number of cache partitions 304*b*.

In an embodiment, the method 600 compares at step 606 the read hit ratio 336*b* for each cache partition 304*b* to the average read hit ratio for all cache partitions 304*b*. In an embodiment, the method 600 determines at step 608 whether the read hit ratio 336*b* for each cache partition 304*b* is less than the average read hit ratio. If so, the method 600 at step 610 decreases the current partition size 344*b* by an amount proportional to the difference between the read hit ratio 336*b* and the average read hit ratio for each cache partition 304*b* having a read hit ratio 336*b* less than the average read hit ratio. As an example, the average read hit ratio is computed as 0.5 and each cache partition 304*b* starts as a 1000 GB partition size 344*b* with a maximum partition size 342*b* of 1500 GB and a minimum partition size 340*b* of 500 GB. For a cache partition 304*b* that includes a computed read hit ratio 336*b* of 0.4, the method 600 at step 610 decreases the current partition size 344*b* by 100 GB, as computed by [(0.5−0.4)*1000 GB]. For a different cache partition 304*b* that includes a computed read hit ratio of 0.42, the method 600 at step 610 decreases the current partition size 344*b* by 80 GB, as computed by [(0.5−0.42)*1000 GB]. In an embodiment, the method 600 determines at step 612 whether the decreased partition size 344*b* is less than the minimum partition size 340*b* for each cache partition 344 having a read hit ratio 336*b* less than the average read hit ratio. If so, the method 600 sets at step 614 the current partition size 344*b* to the minimum partition size 340*b* for each cache partition having an adjusted partition size less than the minimum partition size 340*b*. If not, the method 600 maintains the current partition size 344*b* as the adjusted partition size computed in step 610 and proceeds to step 616. In an embodiment, the method 600 computes at step 616 a sum of the partition size decreases for all the cache partitions 304*b* having a read hit ratio 336*b* less than the average read hit ratio. In an embodiment, the method then proceeds to step 630.

In an embodiment, if the method 600 determined at step 608 that the read hit ratio 336*b* was not less than the computed average read hit ratio, then the method at step 620 increases the current partition size 344*b* by an amount proportional to the difference between the read hit ratio 336*b* and the average read hit ratio for each cache partition 304*b* having a read hit ratio 336*b* greater than the average read hit ratio. As in an earlier example, the average read hit ratio is computed as 0.5 and each cache partition 304*b* starts as a 1000 GB partition size 344*b* with a maximum partition size 342*b* of 1500 GB and a minimum partition size 340*b* of 500 GB. For a cache partition 304*b* that includes a computed read hit ratio 336*b* of 0.6, the method 600 at step 620 increases the current partition size 344*b* by 100 GB, as computed by [(0.6−0.5)*1000 GB]. For a different cache partition 304*b* that includes a computed read hit ratio of 0.62, the method 600 at step 610 decreases the current partition size 344*b* by 120 GB, as computed by [(0.62−0.5)*1000 GB]. In an embodiment, the method 600 determines at step 622 whether the increased partition size 344*b* is greater than the maximum partition size 342*b* for each cache partition 344 having a read hit ratio 336*b* greater than the average read hit ratio. If so, the method 600 sets at step 624 the current partition size 344*b* to the maximum partition size 342*b* for each cache partition having an adjusted partition size greater than the maximum partition size 342*b*. If not, the method 600 maintains the current partition size 344*b* as the adjusted partition size computed in step 620 and proceeds to step 626. In an embodiment, the method 600 computes at step 626 a sum of the partition size increases for all the cache partitions 304*b* having a read hit ratio 336*b* greater than the average read hit ratio. In an embodiment, the method then proceeds to step 630.

In an embodiment, the method 600 then compares at step 630 the sum of the decreases in partition sizes computed in step 616 with the sum of the increases in partition sizes computed in step 626. In an embodiment, the method 600 determines at step 632 whether the sum of the partition size decreases is less than the sum of the partition size increases. If so, the method 600 at step 636 adjusts the sum of the partition size increases to balance the smaller sum of the partition size decreases. In certain embodiments, the partition size increase of each cache partition 304*b* having a read hit ratio 336*b* greater than the average read hit ratio can be adjusted equally such that the adjusted sum of partition size increases balances with the smaller sum of partition size decreases. In certain embodiments, the partition size increase of each cache partition 304*b* having a read hit ratio 336*b* greater than the average read hit ratio can be adjusted proportionally such that the adjusted sum of partition size increases balances with the smaller sum of partition size decreases. As an example, if two cache partitions 304*b* yield a sum of partition size increases of 220 GB that exceeds the sum of cache partition size decreases by 40 GB, then a cache management policy can reduce the partition size increases for each partition 304*b* by 20 GB. In the alternative, the cache management policy can also reduce the partition size increase for each cache partition 304*b* in proportion to the comparative current partition sizes 344*b* of the cache partitions 304*b*. In an embodiment, the method 600 then proceeds to step 640.

In an embodiment, if the sum of the partition size decreases is not less than the sum of the partition size increases, the method 600 determines at step 634 if the sum of the partition size decreases is greater than the sum of the partition size increases. If so, the method 600 at step 638 adjusts the sum of the partition size decreases to balance the smaller sum of the partition size increases. In certain embodiments, the partition size decrease of each cache partition 304*b* having a read hit ratio 336*b* less than the average read hit ratio can be adjusted equally such that the adjusted sum of partition size decreases balances with the smaller sum of partition size increases. In certain embodiments, the partition size decrease of each cache partition 304*b* having a read hit ratio 336*b* less than the average read hit ratio can be adjusted proportionally such that the adjusted sum of partition size decreases balances with the smaller sum of partition size increases. As in the previous example, if two cache partitions 304*b* yield a sum of partition size decreases of 200 GB that exceeds the sum of cache partition size increases by 20 GB, then a cache management policy can reduce the partition size decreases for each partition 304*b* by 10 GB. In the alternative, the cache management policy can also reduce the partition size decrease for each cache partition 304*b* in proportion to the comparative current partition sizes 344*b* of the cache partitions 304*b*. In an embodiment, the method 600 then proceeds to step 640.

In an embodiment, if the sum of the partition size decreases is equal to the sum of the partition size increases (one is not less than or greater than the other), the method 600 need not adjust the computed partition sizes 344*b* for each of the cache partitions 304*b* and the method proceeds to step 340. In an embodiment, the method at step 640 saves the adjusted partition size 344*b* for each cache partition 304*b*. In addition, the method 600 at step 640 resets the read hit counter 332*b*, the read access counter 334*b*, and the read hit ratio 336b for each cache partition 304b in the lower performance portion 218b of the cache memory 218.

In an embodiment, the method 600 describes adjusting the cache partition 304b sizes in the SCM while maintaining a fixed allocation size of the cache memory 218 for all of the cache partitions 304b. In alternate embodiments, the method 600 need not maintain a fixed allocation size of cache memory for all of the cache partitions 304b. The allocation size for all the cache partitions 304b could be allowed to increase or decrease within the limits of the sum of the maximum 342b and minimum 340b partition sizes of the individual cache partitions 304b. In such alternate embodiments, the method 600 would not need to compare the total partition size increases with the total partition size decreases and adjust the increases and decreases of the individual cache partition sizes 344b to balance the total partition increases with the total partition size decreases.

As stated previously, cache management methods and systems improve the performance of storage systems by maintaining highly accessed data tracks in the cache memory 218, and reducing the time to read the requested data. Thus, increasing the size of the cache memory 218 by using less expensive flash memory, or SCM 218b, is an important element of an effective cache memory management policy. The present invention focuses on reserving segments of the SCM, or cache partitions 304b, for specific types of data or data used for specific purposes or with specific software applications. The present invention describes cache management policies that dynamically adjust the size of the cache partitions 304b to optimize the cache memory system and improve the performance of the storage system. The present invention does not describe other elements of effective cache management methods and systems, such as transferring data tracks between the cache memory 218 and the storage devices 204, or between the higher performance cache portion 218a and the lower performance cache portion 218b.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed:

1. A computer program product for dynamically adjusting partition sizes within a storage system cache memory having a higher performance portion and a lower performance portion (SCM), the computer program product comprising a non-transitory computer-readable storage medium having computer-usable program code embodied therein, the computer-usable program code configured to perform operations when executed by at least one processor, the operations comprising:
reserving a plurality of cache partitions in the SCM, each of the cache partitions designated for storing data of a specific type or used for a specific purpose;
maintaining a read hit counter and a read access counter for each of the cache partitions during a time interval;
computing a read hit ratio for each of the cache partitions;
computing an average read hit ratio for the plurality of the cache partitions; and
adjusting the partition size of each of the cache partitions based on the read hit ratio for the cache partition and the average read hit ratio for the plurality of the cache partitions.

2. The computer program product of claim 1, wherein the maintaining the read hit counter for each of the cache partitions comprises incrementing the read hit counter for each of the cache partitions when a read request of a storage element results in a read hit of the storage element from the cache partition.

3. The computer program product of claim 1, wherein the maintaining the read access counter for each of the cache partitions comprises incrementing the read access counter for each of the cache partitions when a read request of a storage element results in a read hit of the storage element from the cache partition or a read access of the storage element from a storage device within the storage system.

4. The computer program product of claim 1, wherein the computing of the read hit ratio for each of the cache partitions comprises dividing the read hit counter by the read access counter for each of the cache partitions.

5. The computer program product of claim 1, wherein the computing of the average read hit ratio for the plurality of the cache partitions comprises computing a sum of the read hit ratios for each of the cache partitions and dividing the sum of the read hit ratios by the plurality of the cache partitions.

6. The computer program product of claim 1, wherein the adjusting the partition size of each of the cache partitions further comprises:
increasing the partition size of each cache partition up to a maximum partition size for each cache partition in proportion to the difference that the read hit ratio for each cache partition is greater than the average read hit ratio for the plurality of cache partitions; and
decreasing the partition size of each cache partition up to a minimum partition size for each cache partition in proportion to the difference that the read hit ratio for each cache partition is less than the average read hit ratio for the plurality of cache partitions.

7. The computer program product of claim 6, wherein the adjusting of the partition size of each of the cache partitions further comprises:
computing a sum of the partition size increases for the cache partitions having the read hit ratio greater than the average read hit ratio and computing a sum of the partition size decreases for the cache partitions having the read hit ratio less than the average read hit ratio;
reducing the partition size increases for the cache partitions having the read hit ratio greater than the average read hit ratio if the sum of partition size increases is greater than the sum of the partition size decreases; and
reducing the partition size decreases for the cache partitions having the read hit ratio less than the average read hit ratio if the sum of partition size decreases is greater than the sum of the partition size increases.

8. The computer program product of claim 1, wherein the reserving the plurality of cache partitions in the SCM further comprises:
- designating the cache partition for storing favored storage elements stored within favored storage volumes in the storage system;
- designating the cache partition for storing metadata related to storage elements stored within storage volumes in the storage system;
- designating the cache partition for storing storage elements used with cache fast write (CFW) operations executing with software applications within the storage system; and
- designating the cache partition for storing storage elements used with pre-fetching operations executing with software applications within the storage system.

9. A method for dynamically adjusting cache partition sizes within a storage system, the storage system including at least one processor, a cache memory having a higher performance portion and a lower performance portion (SCM), and a computer-readable storage medium having computer-usable program code embodied therein, the computer-usable program code configured to perform operations when executed by at least one processor, the method comprising:
- reserving a plurality of cache partitions in the SCM, each of the cache partitions designated for storing data of a specific type or used for a specific purpose;
- maintaining a read hit counter and a read access counter for each of the cache partitions during a time interval;
- computing a read hit ratio for each of the cache partitions;
- computing an average read hit ratio for the plurality of the cache partitions; and
- adjusting the partition size of each of the cache partitions based on the read hit ratio for the cache partition and the average read hit ratio for the plurality of the cache partitions.

10. The method of claim 9, wherein the maintaining the read hit counter for each of the cache partitions comprises incrementing the read hit counter for each of the cache partitions when a read request of a storage element results in a read hit of the storage element from the cache partition.

11. The method of claim 9, wherein the maintaining the read access counter for each of the cache partitions comprises incrementing the read access counter for each of the cache partitions when a read request of a storage element results in a read hit of the storage element from the cache partition or a read access of the storage element from a storage device within the storage system.

12. The method of claim 9, wherein the computing of the read hit ratio for each of the cache partitions comprises dividing the read hit counter by the read access counter for each of the cache partitions; and wherein the computing of the average read hit ratio for the plurality of the cache partitions comprises computing a sum of the read hit ratios for each of the cache partitions and dividing the sum of the read hit ratios by the plurality of the cache partitions.

13. The method of claim 9, wherein the adjusting the partition size of each of the cache partitions further comprises:
- increasing the partition size of each cache partition up to a maximum partition size for each cache partition in proportion to the difference that the read hit ratio for each cache partition is greater than the average read hit ratio for the plurality of cache partitions; and
- decreasing the partition size of each cache partition up to a minimum partition size for each cache partition in proportion to the difference that the read hit ratio for each cache partition is less than the average read hit ratio for the plurality of cache partitions.

14. The method of claim 13, wherein the adjusting of the partition size of each of the cache partitions further comprises:
- computing a sum of the partition size increases for the cache partitions having the read hit ratio greater than the average read hit ratio and computing a sum of the partition size decreases for the cache partitions having the read hit ratio less than the average read hit ratio;
- reducing the partition size increases for the cache partitions having the read hit ratio greater than the average read hit ratio if the sum of partition size increases is greater than the sum of the partition size decreases; and
- reducing the partition size decreases for the cache partitions having the read hit ratio less than the average read hit ratio if the sum of partition size decreases is greater than the sum of the partition size increases.

15. A storage controller for dynamically adjusting cache partition sizes within a storage system, the storage controller including a processor, a cache memory having a higher performance portion and a lower performance portion (SCM), and a computer program product, the computer program product comprising a non-transitory computer-readable storage medium having computer-usable program code embodied therein, the computer-usable program code configured to perform operations when executed by the processor, the operations comprising:
- reserving a plurality of cache partitions in the SCM, each of the cache partitions designated for storing data of a specific type or used for a specific purpose;
- maintaining a read hit counter and a read access counter for each of the cache partitions during a time interval;
- computing a read hit ratio for each of the cache partitions;
- computing an average read hit ratio for the plurality of the cache partitions; and
- adjusting the partition size of each of the cache partitions based on the read hit ratio for the cache partition and the average read hit ratio for the plurality of the cache partitions.

16. The storage controller of claim 15, wherein the maintaining the read hit counter for each of the cache partitions comprises incrementing the read hit counter for each of the cache partitions when a read request of a storage element results in a read hit of the storage element from the cache partition.

17. The storage controller of claim 15, wherein the maintaining the read access counter for each of the cache partitions comprises incrementing the read access counter for each of the cache partitions when a read request of a storage element results in a read hit of the storage element from the cache partition or a read access of the storage element from a storage device within the storage system.

18. The storage controller of claim 15, wherein the computing of the read hit ratio for each of the cache partitions comprises dividing the read hit counter by the read access counter for each of the cache partitions; and wherein the computing of the average read hit ratio for the plurality of the cache partitions comprises computing a sum of the read hit ratios for each of the cache partitions and dividing the sum of the read hit ratios by the plurality of the cache partitions.

19. The storage controller of claim 15, wherein the adjusting the partition size of each of the cache partitions further comprises:

increasing the partition size of each cache partition up to a maximum partition size for each cache partition in proportion to the difference that the read hit ratio for each cache partition is greater than the average read hit ratio for the plurality of cache partitions; and decreasing the partition size of each cache partition up to a minimum partition size for each cache partition in proportion to the difference that the read hit ratio for each cache partition is less than the average read hit ratio for the plurality of cache partitions.

20. The storage controller of claim 15, wherein the adjusting of the partition size of each of the cache partitions further comprises:

computing a sum of the partition size increases for the cache partitions having the read hit ratio greater than the average read hit ratio and computing a sum of the partition size decreases for the cache partitions having the read hit ratio less than the average read hit ratio;

reducing the partition size increases for the cache partitions having the read hit ratio greater than the average read hit ratio if the sum of partition size increases is greater than the sum of the partition size decreases; and reducing the partition size decreases for the cache partitions having the read hit ratio less than the average read hit ratio if the sum of partition size decreases is greater than the sum of the partition size increases.

* * * * *